March 25, 1958     H. L. AVERY     2,827,687
MACHINE TOOL
Filed Sept. 25, 1953
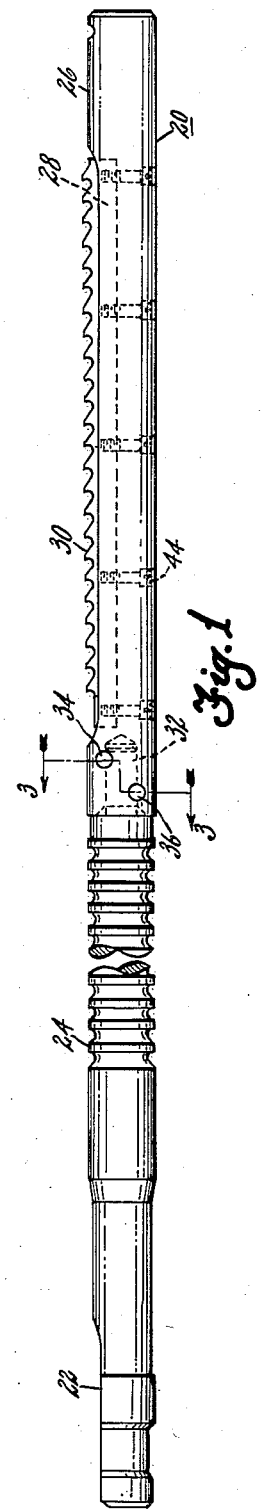
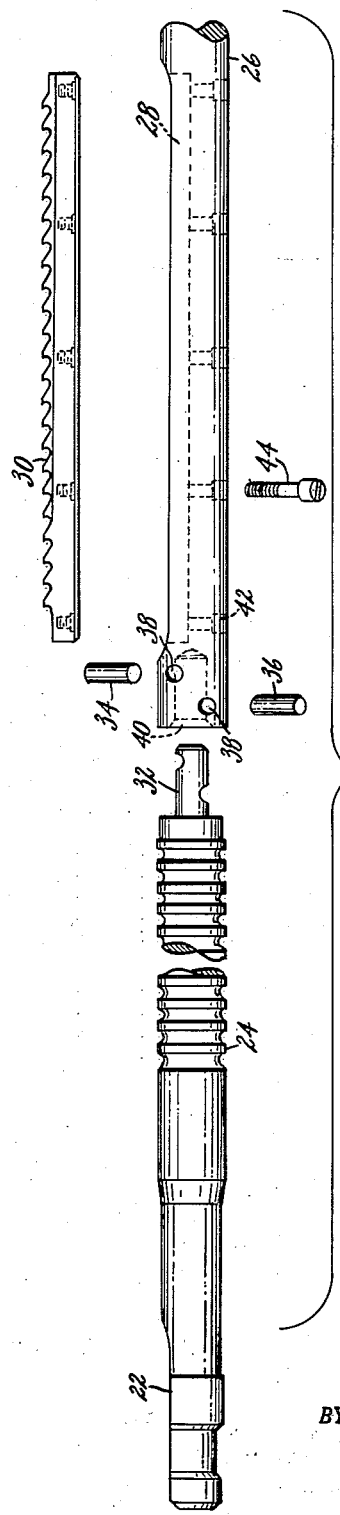
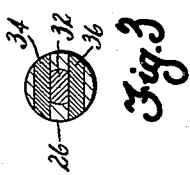
INVENTOR.
HENRY L. AVERY
BY
HIS ATTORNEY

United States Patent Office 2,827,687
Patented Mar. 25, 1958

2,827,687

MACHINE TOOL

Henry L. Avery, Englewood, Ohio, assignor to General Motors Corporation, Detroit, Mich., a corporation of Delaware Application September 25, 1953, Serial No. 382,251

1 Claim. (Cl. 29—95.1)

This invention relates to machine tools and is particularly concerned with a combination keyway and bore broach.

It is, therefore, an object to provide an improved keyway and bore broach wherein portions thereof are replaceable for reducing the cost of the broach and for facilitating its continued use.

In carrying out the above object, it is a further object to provide a keyway and bore broach wherein the bore broach portion thereof is replaceable with respect to the keyway broach portion thereof and wherein the keyway portion per se is replaceable within its fixture which is attachable to the bore broach portion of the composite tool.

Combination keyway and bore broaches are expensive pieces of equipment which, upon excessive wear, must be discarded in their entirety. This invention is directed specifically to eliminating the past difficulties by making a broach of the composite type wherein either the keyway portion or the bore broach portion are independently replaceable and wherein the keyway portion is insertable with the fixture so that only a minimum of material is required for replacement.

Further objects and advantages of the present invention will be apparent from the following description, reference being had to the accompanying drawing, wherein a preferred embodiment of the present invention is clearly shown.

In the drawing:

Fig. 1 shows a plan view of a combination keyway and bore broach.

Fig. 2 is an expanded view of the broach shown in Fig. 1 with all of the parts in disassembled relation.

Fig. 3 is a section through 3—3 of Fig. 1.

The keyway and bore broach disclosed herein is shown at 20 in Fig. 1 and includes a holding or mounting fixture 22 at one end thereof which carries a bore broach portion 24 thereon. At the other end of the portion 24 a fixture 26 is provided having a longitudinal slot 28 therein which removably carries a keyway broach 30.

As noted in Fig. 2, it will be seen that the bore broach 24 may be assembled to the fixture 26 by means of an aligning pin 32 and drive pins 34 and 36 which pass through transverse apertures 38 in the fixture portion 26. The pin 32 on broach portion 24 may be assembled into a blind aperture 40 in the fixture 26 whereupon the pins 34 and 36 may be driven into position to lock the two portions together.

Within the fixture 26 is included a longitudinally extending groove 28 having a plurality of screw holes 42 passing therein at the root thereof. The keyway broach 30 fits snugly within the groove 28 and a plurality of screws 44 may then be passed through the holes 42 and threadedly engage the keyway broach 30 to hold it tightly in place.

During use of the broach if the bore broach 24 thereof becomes worn, a new bore broach portion 24 may be attached to the fixture 26. On the other, if the bore broach 24 is up to size and the keyway broach 30 becomes worn, it may readily be replaced within the composite portion. If both the keyway and bore broach portions become worn, the fixture 26 may be reclaimed and assembled to other parts. Thus, at no time is it necessary to discard the entire tool since portions thereof may be readily repaired or replaced with a minimum effort and expense.

While the embodiment of the present invention as herein disclosed, constitutes a preferred form, it is to be understood that other forms might be adopted.

What is claimed is as follows:

A combination bore and keyway broach for metal and the like comprising in combination, a bore broach portion including an integral holding fixture at one end thereof, a reduced diameter extension at the other end thereof, a keyway broach fixture having a longitudinally extending groove therein and including a socket at one end thereof adapted to receive the reduced diameter extension of the bore broach portion, said socket having two spaced transverse holes therethrough and said extension having a pair of opposed and longitudinally spaced transverse grooves therein adapted to align with said holes when the extension is fitted within said socket, a pair of drive pins adapted to pass through said holes and tightly engage said grooves for holding the bore broach portion and the keyway broach fixture in assembled nonrotative relation to one another whereby the holding fixture is indexed with respect to the keyway groove, and a keyway broach removably assembled in said longitudinal groove.

References Cited in the file of this patent

UNITED STATES PATENTS

| | | |
|---|---|---|
| 1,425,122 | McKechnie | Aug. 8, 1922 |
| 1,443,058 | Taylor | Jan. 23, 1923 |
| 2,331,499 | Phaneuf | Oct. 12, 1943 |
| 2,517,358 | Seaman | Aug. 1, 1950 |
| 2,641,822 | Sampson | June 16, 1953 |

FOREIGN PATENTS

| | | |
|---|---|---|
| 548,583 | Great Britain | Oct. 15, 1942 |